O. A. GRIMNES.
PROCESS FOR HEATING, COOKING, &c., BY MEANS OF ELECTRIC ENERGY.
APPLICATION FILED MAR. 22, 1919.

1,318,746.

Patented Oct. 14, 1919.

Inventor
Öyven Andersen Grimnes by Laurence Langner
Attorney

UNITED STATES PATENT OFFICE.

OYVEN ANDERSEN GRIMNES, OF BAATSVIK, NEAR RISÖR, NORWAY.

PROCESS FOR HEATING, COOKING, &c., BY MEANS OF ELECTRIC ENERGY.

1,318,746. Specification of Letters Patent. Patented Oct. 14, 1919.

Application filed March 22, 1919. Serial No. 284,453.

*To all whom it may concern:*

Be it known that I, OYVEN ANDERSEN GRIMNES, of Baatsvik, near Risör, in the Kingdom of Norway, have invented certain new and useful Improvements in Processes for Heating, Cooking, &c., by Means of Electric Energy; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a process for indirect heating by means of electric energy, and the invention consists in the use of superheated steam as a heat transmitting medium between the electrically heated resistance or the like and the body to be heated. Said superheated steam is produced by electrically heating a quantity of liquid in a closed tube system. The electric heating of the liquid or steam may take place directly by means of the usual electric heating elements or indirectly by means of induction or electric heat stored in suitable heat accumulators.

On the drawing, two forms of the invention are illustrated.

Figure 1:
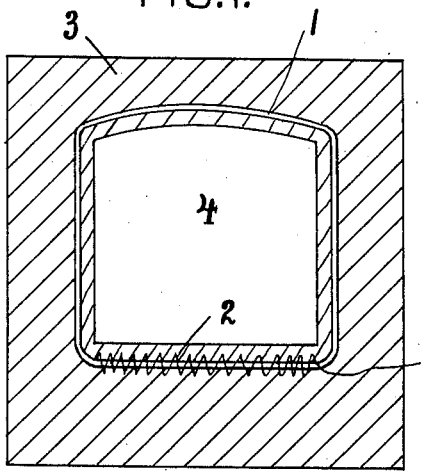
Figure 1 is a section through a heating apparatus with a single closed heating chamber.

On Fig. 1 the heating chamber 4 is surrounded by closed tube coils 1, which contain a quantity of liquid and are provided with an electric heating element 2. The whole arrangement is placed in a box 3 or the like filled with a suitable insulating material. When the quantity of liquid contained in the closed tube system is completely evaporated, pressure as well as temperature will increase in proportion to the degree of superheating, and in this manner it is possible to obtain any temperature desirable for house-hold cooking purposes.

Figure 2:
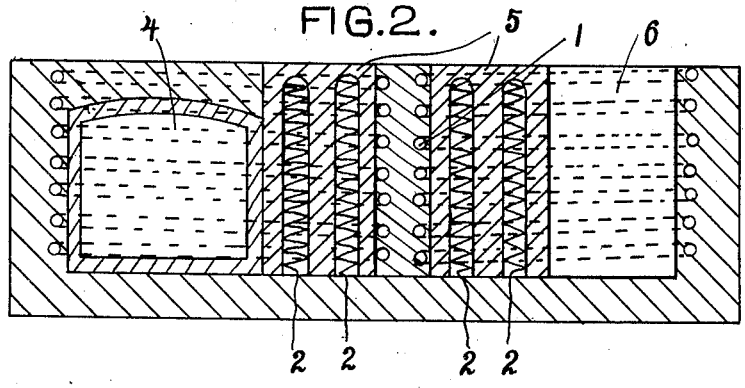
Fig. 2 is a section through a heating apparatus with two heating chambers and accumulating arrangements for the direct heat in accumulator bodies of iron.

In the form of the invention illustrated in Fig. 2 the heating elements 2 are placed in iron blocks 5 or the like which accumulate the heat and are in direct contact with the closed tube coils 1. Two tube systems are shown each inclosing a cooking chamber 4, 6. The top of the iron blocks 5 may be used as frying plates.

I claim:

1. In an apparatus for heating, cooking, etc., the combination with a cooking or heating chamber, of a closed tube system containing a quantity of liquid, and means for electrically heating said liquid and superheating the steam in the tube system, said tubes surrounding said heating chamber.

2. In an apparatus for heating, cooking, etc., by means of electric energy the combination with a cooking or heating chamber of a closed tube system containing a quantity of liquid and surrounding the cooking or heating chamber, bodies of suitable material for storing heat, and means for electrically heating said accumulating bodies, said bodies being so placed as to transmit their heat to the liquid and the said closed tube system.

3. In an apparatus for heating, cooking, etc., by means of electric energy the combination with a cooking or heating chamber of a closed system containing a quantity of liquid, bodies of suitable material for storing heat, and means for electrically heating said accumulating bodies, said bodies being so placed as to transmit their heat to the liquid and the said closed tube system, and at the same time being adapted to act as frying plates.

In testimony that I claim the foregoing as my invention, I have signed my name in presence of two subscribing witnesses.

OYVEN ANDERSEN GRIMNES.

Witnesses:
   AUGUST BUGGE,
   CHAS. C. MARVIN.